United States Patent
Shvodian

(10) Patent No.: US 10,932,302 B1
(45) Date of Patent: Feb. 23, 2021

(54) CONTROL OF WIRELESS CONNECTIVITY BASED ON INABILITY TO INTERPRET SYSTEM MESSAGE DATA FLAGGED AS CRITICAL TO OPERATION

(71) Applicant: Sprint Spectrum L.P., Overland Park, KS (US)

(72) Inventor: William Shvodian, McLean, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/929,168

(22) Filed: Nov. 22, 2019

(51) Int. Cl.
*H04W 76/10* (2018.01)
*H04W 48/08* (2009.01)

(52) U.S. Cl.
CPC .......... *H04W 76/10* (2018.02); *H04W 48/08* (2013.01)

(58) Field of Classification Search
None
See application file for complete search history.

(56) References Cited

U.S. PATENT DOCUMENTS

| | | | |
|---|---|---|---|
| 8,391,141 B2 | 3/2013 | Rune et al. | |
| 8,731,606 B2 | 5/2014 | Yoshihara et al. | |
| 8,929,907 B1 | 1/2015 | Vargantwar et al. | |
| 9,894,602 B1 | 2/2018 | Manchanda et al. | |
| 9,912,450 B2 | 3/2018 | McNamara et al. | |
| 10,070,440 B2 | 9/2018 | McNamara et al. | |
| 10,206,162 B2 | 2/2019 | Van Der Velde et al. | |
| 10,341,933 B1 * | 7/2019 | Parihar | H04W 40/22 |
| 10,542,475 B1 * | 1/2020 | Singh | H04W 76/28 |
| 2006/0198350 A1 | 9/2006 | Kim | |
| 2009/0122782 A1 | 5/2009 | Horn et al. | |
| 2009/0131110 A1 | 5/2009 | Balachandran et al. | |
| 2010/0067436 A1 | 3/2010 | Kouda et al. | |
| 2012/0307739 A1 | 12/2012 | Ishihara et al. | |
| 2013/0100924 A1 | 4/2013 | Striuli et al. | |
| 2015/0327133 A1 | 11/2015 | Yiu et al. | |
| 2016/0157170 A1 | 6/2016 | Daoud Triki et al. | |
| 2017/0019802 A1 | 1/2017 | Ode | |
| 2017/0367036 A1 | 12/2017 | Chen et al. | |
| 2018/0063841 A1 | 3/2018 | Song et al. | |
| 2018/0270677 A1 * | 9/2018 | Brisebois | H04W 36/0022 |
| 2019/0037417 A1 | 1/2019 | Lei et al. | |

OTHER PUBLICATIONS

3GPP 3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.7.0 (Sep. 2019).

* cited by examiner

*Primary Examiner* — Kenny S Lin

(57) ABSTRACT

A mechanism to control wireless connectivity of a wireless communication device (WCD) with an access node on a carrier. When within coverage provided by the access node on the carrier, the WCD receives a system message broadcast by the access node on the carrier, the system message carrying data that represents an operational parameter for service on the carrier. Further, the WCD makes a first determination that the WCD is unable to interpret the data that is carried by the received system message and makes a second determination that the received system message flags the data as being critical to service on the carrier. And in response to at least a combination of the first and second determinations, the WCD forgoes connecting with the access node on the carrier.

20 Claims, 4 Drawing Sheets

CONTROL OF WIRELESS CONNECTIVITY BASED ON INABILITY TO INTERPRET SYSTEM MESSAGE DATA FLAGGED AS CRITICAL TO OPERATION

BACKGROUND

A cellular wireless network typically includes a number of cell sites including access nodes that are configured to provide wireless coverage areas in which wireless communication devices (WCDs) such as cell phones, tablet computers, machine-type-communication devices, tracking devices, embedded wireless modules, and/or other wirelessly equipped communication devices can operate. Further, each access node could be coupled with a core network that provides connectivity with various application servers and/or transport networks, such as the public switched telephone network (PSTN) and/or the Internet for instance. With this arrangement, a WCD within coverage of the cellular network could engage in air interface communication with an access node and could thereby communicate via the access node with various application servers and other entities.

Such a network could operate in accordance with a particular radio access technology (RAT), with communications from the access nodes to WCDs defining a downlink or forward link and communications from the WCDs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide coverage on one or more carriers, each of which could be frequency division duplex (FDD), defining separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency.

Further, on the downlink and uplink channels, the air interface on each carrier could be configured in a specific manner to define physical resources for carrying information wirelessly between the access node and WCDs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data.

Further, in each subframe or other transmission time interval, the resource elements on the downlink and uplink of the example air interface could be grouped to define physical resource blocks (PRBs) that could be allocated as needed to carry data between the access node and served WCDs.

In addition, certain resource elements on the example air interface could be reserved for special purposes. For instance, on the downlink, certain resource elements could be reserved to carry synchronization signals that indicate the presence of coverage on the carrier, other resource elements could be reserved to carry broadcast messages specifying system information, and still other resource elements could be reserved to carry a reference signal that WCDs could measure in order to determine coverage strength.

Overview

When a WCD enters into coverage of an example network, the WCD could scan for and detect coverage of an access node on a carrier. With the example air-interface configuration described above, for instance, the WCD could scan one or more predefined carrier frequencies in search of a synchronization signal indicating the presence of coverage on a carrier. Upon finding such coverage, the WCD could then read one or more broadcast messages on the carrier, in order to determine operational parameters related to service on the carrier. And the WCD could evaluate the reference signal on the carrier, in order to determine coverage strength.

Upon determining that coverage on the carrier is sufficiently strong to justify connecting (e.g., at least predefined threshold strong), the WCD could then engage signaling to connect with the access node. For instance, the WCD could initiate random-access signaling with the access node and could then engage in Radio Resource Control (RRC) signaling with the access node to establish an RRC connection through which the access node will then serve the WCD. Further, if the WCD is not already registered for service with the core network, the WCD could transmit to the access node an attach request, which the access node could forward to a core-network controller for processing. And the core-network controller could then coordinate setup for the WCD of one or more bearers extending between the WCD and a core-network gateway that provides transport-network connectivity.

Once the WCD is so connected and registered, the access node could then serve the WCD in a connected mode, managing downlink air-interface communication of packet data to the WCD and uplink air-interface communication of packet data from the WCD.

For example, when packet data for the WCD arrives at the core network from a transport network, the data could flow to the WCD's serving access node, and the access node could then schedule and provide transmission of that data to the WCD on particular downlink PRBs of the WCD's serving carrier. Likewise, when the WCD has data to transmit on the transport network, the WCD could transmit a scheduling request to the access node, the access node could responsively schedule transmission of that data from the WCD on particular uplink PRBs of the WCD's serving carrier, and the WCD could accordingly transmit the data to the access node for forwarding through the core network to the transport network.

As the industry advances from one generation of wireless technology to the next or from one version of wireless technology to another, wireless service providers may upgrade their access nodes to support new and useful service features. Further, wireless service providers and/or others may offer new and improved WCDs that are configured with hardware and/or software designed to support these service features.

Unfortunately, however, legacy WCDs or other less-advanced WCDs may not support some or all of such new service features. For instance, legacy WCDs may lack hardware components (e.g., certain advanced RF components) that may be required to facilitate use of the latest features. And legacy WCDs may lack software or other control logic that may be required to facilitate use of the latest features.

In some cases, this may not be a significant problem, as WCDs that do not support certain new service features may simply not make use of those features and thus not benefit from those features. However, in some situations, when a WCD does not support a feature of an access node's service, it may be best for the WCD to avoid being served by the access node altogether.

Without limitation, an example of this situation is where an access node provides service on a carrier that is configured with a special subcarrier configuration but where a legacy WCD operates with an older subcarrier configuration and does not include control logic supporting the new subcarrier configuration. In that situation, if the WCD connects with the access node and the access node serves the WCD, the WCD may attempt to communicate using the older subcarrier configuration, but doing so may create interference or other service problems. Therefore, it may be best for such a WCD to not be served by the access node at all, perhaps to instead be served by a different access node.

Disclosed herein is a mechanism to help avoid having a WCD connect with an access node in a scenario where the WCD lacks support for a service feature of the access node, and particularly where the WCD lacks knowledge and understanding of the service feature.

The disclosed mechanism takes advantage of the fact that the WCD lacks knowledge of the service feature and therefore lacks knowledge to understand data referring to the service feature. In accordance with the disclosure, the access node will broadcast on the carrier a system message that contains data specifying the service feature and that flags the data as being critical to service on the carrier. (For instance, the message could enclose the data within a hierarchical section of the message labeled as containing information essential to service on the carrier.) When the WCD that lacks knowledge of that service feature is within coverage of the access node on the carrier, the WCD will then receive and read that broadcast system message, and the WCD will find that the message includes data that the WCD cannot interpret but that the message flags as being critical to service on the carrier. And in response to that finding, the WCD will forgo connecting with the access node on the carrier.

With this process, the data being flagged as being critical to service on the carrier could cause a WCD to connect with the access node on the carrier only if the WCD determines that the WCD can interpret the data and thus to not connect with the access node on the carrier if the WCD cannot interpret the data.

By way of example, when a WCD is within threshold strong coverage of the access node and could therefore connect the access node, the WCD could read the system broadcast message and determine that the message carries the data that is flagged as being critical to service on the carrier. Because the data in the broadcast system message is flagged as being critical to service on the carrier, the WCD could then further determine whether the WCD is able to interpret that data. And if the WCD determines that the WCD is able to interpret the data that is flagged as being critical to service on the carrier, then, based at least on that ability, the WCD could proceed to connect with the access node on the carrier. Whereas, if the WCD determines that the WCD is unable to interpret the data that is flagged as being critical to service on the carrier, then, based at least on that inability, the WCD could forgo connecting with the access node on the carrier.

Without limitation, this mechanism could be applied by way of example with respect to the subcarrier-configuration example discussed above.

In that example scenario, the access node could broadcast on the carrier a system message that carries a binary codeword representing downlink-uplink subcarrier-shift operational parameter and that flags the binary codeword as being critical to service on the carrier.

A newer WCD that is programmed to support this subcarrier-shift feature may include control logic that defines the binary codeword, such as mapping data that indicates that the codeword means that the carrier's downlink subcarriers are shifted in relation to the carrier's uplink subcarriers. Thus, the newer WCD may be able to interpret that binary codeword, determining what the binary codeword means, and to operate accordingly in line with the subcarrier-shift feature. Whereas a legacy WCD may lack such support and may therefore not possess control logic that defines the binary codeword, so the legacy WCD may be unable to interpret the binary codeword.

In this situation, if the newer WCD is within threshold strong coverage of the access node on the carrier and receives and reads the broadcast system message and finds that the message includes the binary codeword, then the newer WCD may interpret the binary codeword to determine that the carrier has the subcarrier-shift feature. The newer WCD may then connect with the access node on the carrier and proceed to communicate in line with the subcarrier-shift feature.

Whereas, if the legacy WCD is within threshold strong coverage of the access node on the carrier and receives and reads the broadcast system message and finds that the message includes the binary codeword, then the legacy WCD may determine that the legacy WCD is unable to interpret the binary codeword and that the message flags the binary codeword as being critical to service on the carrier. Given that the legacy WCD cannot interpret the binary codeword and given that the message deems that binary codeword to be critical to service on the carrier, the legacy WCD would then responsively forgo connecting with the access node on the carrier. For instance, the legacy WCD could forgo engaging in random-access and RRC signaling to connect with the access node on the carrier.

These principles could apply as well with respect to any of a variety of other operational parameters (i.e., not limited to the subcarrier-shifting example), such as any of a variety of policy rules that might be imposed for service on a carrier. For instance, as a wireless service provider upgrades its access nodes to implement any new and improved technology that legacy WCDs do not support and are unaware of, the described mechanism could conveniently help prevent those legacy WCDs from connecting with those access nodes, perhaps causing the legacy WCDs to connect instead with other access nodes.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of cellular wireless network operating according to 4G LTE and/or 5G NR, with WCDs similarly equipped for such operation. It should be understood, however, that the principles disclosed herein could extend to apply with respect to other scenarios as well, such as with respect to one more other RATs. Further, it should be understood that other variations from the specific arrangements and processes described are possible. For instance, various described entities, connections, functions, and other elements could be added, omitted, distributed, re-located, re-ordered, combined, or changed in other ways.

Figure 1:
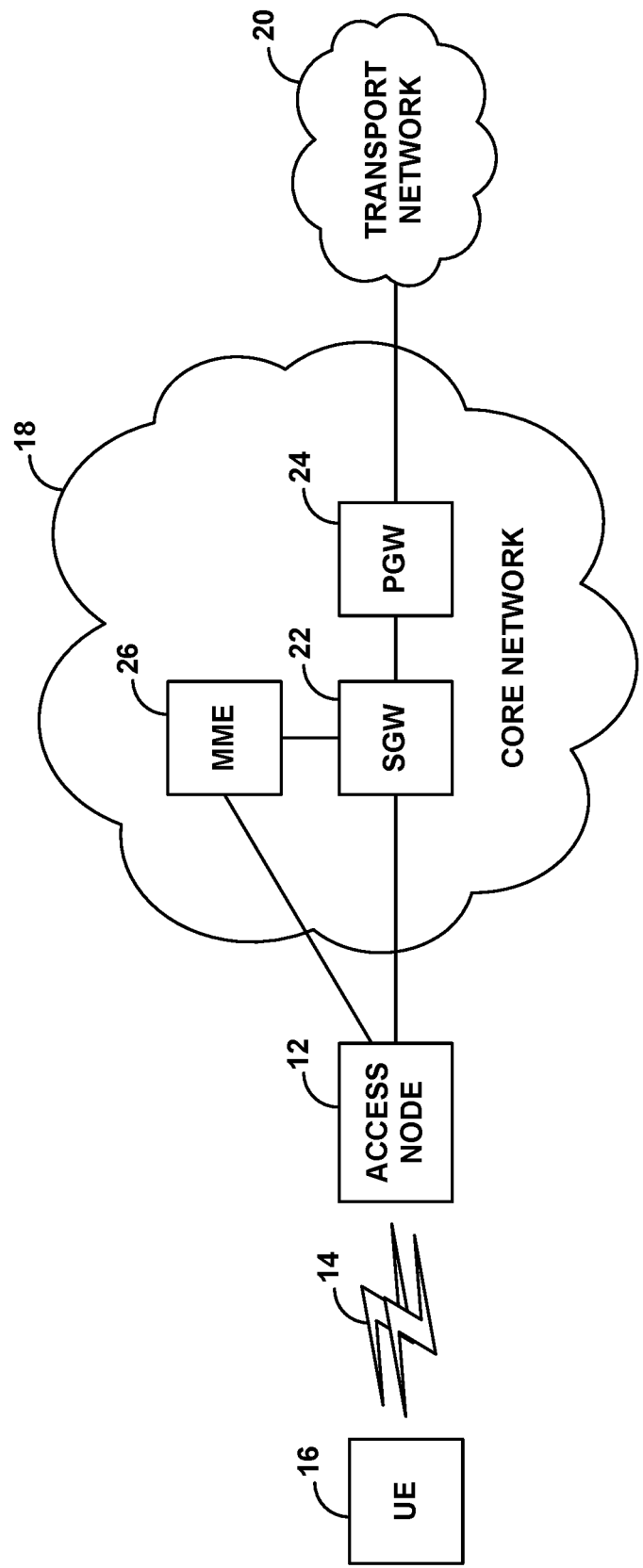
FIG. 1 is a simplified block diagram of an example wireless communication system in which various disclosed features can be implemented.

As noted above, FIG. 1 is a simplified block diagram of an example wireless communication system in which various disclosed features can be implemented. In particular, the figure depicts a representative arrangement an example access node 12 configured to provide coverage and service on each of one or more carriers 14, and the figure depicts an example WCD 16 within coverage of the access node.

Access node 12 could be a macro access node of the type that would typically include a tower mounted antenna structure for providing a broad range of coverage. Or the access node could be a small cell access node, femtocell access node, relay access node, or other type of access node that might have a smaller form factor with an antenna structure that provides a narrower range of coverage, among other possibilities. And WCD 16 could take any of the forms described above, also among other possibilities.

Access node 12 is shown coupled with an example core network 18. Core network 18 could be an evolved packet core (EPC) network, a next generation core (NGC) network, or another network, which could include components supporting an applicable RAT and could provide connectivity with at least one transport network 20, such as the Internet.

In an example implementation as shown, the core network 20 includes a serving gateway (SGW) 22, a packet data network gateway (PGW) 24, and a mobility management entity (MME) 26. In practice, the access node could have an interface with the SGW and an interface with the MME, the MME could have an interface with the SGW, the SGW could have an interface with the PGW, and the PGW could provide connectivity with the transport network. With this arrangement, the SGW and PGW could cooperatively provide user-plane connectivity between the access node and the transport network, to enable the WCD when by the access node to engage in communication on the transport network. And the MME could operate as a controller to carry out operations such as coordinating WCD attachment and setup of user-plane bearers.

Each of the carriers 14 on which the access node operates could be an FDD carrier or a TDD carrier. Further, each carrier could be defined within an industry specified frequency band, by its frequency channel(s) being defined within the frequency band. Examples of such frequency bands include, without limitation, (i) Band 25, which supports FDD carriers and extends from 1850 MHz to 1915 MHz on the uplink and 1930 MHz to 1995 MHz on downlink, (ii) Band 26, which supports FDD carriers and extends from 814 MHz to 849 MHz on the uplink and 859 MHz to 894 MHz on the downlink, and (iii) Band 41, which supports TDD carriers and extends from 2496 MHz to 2690 MHz.

As further noted above, the air interface on each such carrier could be configured to define various air-interface resources. For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier could be divided into subcarriers with a subcarrier spacing on the order of 15 to 240 kHz.

With this arrangement, the air interface on each carrier would define an array of resource elements as noted above. And as indicated above, the resource elements per subframe could be grouped to define allocable PRBs, while certain resource elements could be reserved for special purposes, such as to carry synchronization signals, broadcast messages, and reference signals from the access node to WCDs within coverage of the carrier. Access node 12 and WCD 16 could be preconfigured to operate on the carrier accordingly.

Without limitation, for instance, the access node could broadcast synchronization signals in a predefined group of resource elements centered on the carrier's downlink bandwidth in certain subframes per frame, and the WCD could detect presence of coverage on the carrier and establish frame timing by scanning for and finding the synchronization signals at the carrier's center frequency. Further, the access node could broadcast a reference signal in resource elements distributed in a predefined pattern throughout each downlink subframe of the carrier, and the WCD could measure strength of the reference signal (e.g., reference signal receive power (RSRP)) as an indication of strength of the WCD's coverage on the carrier.

Still further, also without limitation, the access node could periodically broadcast various system messages on a broadcast channel defined within a predefined group of resource elements centered on the carrier's downlink bandwidth, and the WCD could read those broadcast system messages to obtain the system information. Examples of such broadcast system messages include a master information block (MIB), which could specify the carrier's bandwidth and other operational parameters related to service on the carrier, and various system information block (SIB) messages, which could specify other operational parameters related to service on the carrier.

The access node could structure the content of these broadcast system messages using standard encoding (e.g., per Abstract Syntax Notation One (ASN.1)), with discrete information elements being set forth as bit sequences (binary codewords) representing respective system information. A WCD programmed with control logic that maps each of these bit sequences to their respective system information could thus read the broadcast system messages and interpret the information elements so as to obtain the system information and then operate accordingly.

By way of example, the access node could include in the MIB a binary codeword that represents the attribute "carrier bandwidth" together with a value specifying the carrier's bandwidth. And to learn this operational parameter, the WCD could be programmed or otherwise configured with control logic that maps that binary codeword to the logical concept of "carrier bandwidth". Upon reading that binary codeword in the MIB broadcast by the access node, the WCD could therefore determine that the accompanying value in the MIB is the bandwidth of the carrier. And having determined the carrier's bandwidth, the WCD could then use the determined carrier bandwidth as a basis to read other signaling broadcast by the access node in relation to the bandwidth and to operate accordingly.

In line with the discussion above, when WCD 16 enters into coverage of access node 12, the WCD could detect presence of the access node on a carrier 14. Having detected coverage on the carrier, the WCD could then read one or more of the system messages broadcast by the access node on the carrier, in order to learn operational parameters related to service on the carrier. Further, the WCD could evaluate the reference signal broadcast by the access node on the carrier, to determine the WCD's coverage strength on the carrier. And if the WCD determines that the coverage strength is sufficient (e.g., at least as high as a predefined level), the WCD could then proceed to connect with the access node on the carrier.

As noted above, the process of the WCD connecting with the access node on the carrier could involve the WCD and access node engaging in random-access signaling and RRC signaling with each other. For instance, the WCD could first transmit to the access node a random-access preamble signifying the WCD's desire to connect, the access node could responsively provide the WCD with an initial uplink resource grant (e.g., uplink PRB allocation) for carrying an RRC connection request, and the WCD could then transmit to the access node an RRC connection request. Through this and/or other signaling, the access node and WCD could agree on establishment of an RRC connection on the carrier, defining a logical signaling connection between the access node and the WCD, and the access node and WCD could each make a record of that established RRC connection, so that the access node could then serve the WCD in an RRC connected mode on the carrier.

In addition, once the WCD is connected with the access node, the WCD may engage in attach signaling with the MME 26 to register for service if appropriate. For instance, the WCD could transmit to the MME via the access node an attach request. And after authenticating the WCD, the MME could coordinate setup for the WCD of one or more bearers extending between the WCD and the PGW 24, so as to enable the WCD to engage in packet-data communication on the transport network 20. Each such bearer could include a data radio bearer (DRB) portion extending over the air interface on the carrier between the WCD and the access node and an access-bearer portion extending via the SGW 22 between the access node and the PGW.

Once the UE is connected and attached in the example arrangement, the access node could then serve the UE with packet-data communications as noted above.

For instance, when the access node receives data to transmit to the UE, the access node could allocate one or more downlink PRBs in a subframe for use to transmit at least a portion of the data, defining a transport block, to the WCD. The access node could then transmit to the WCD a Downlink Control Information (DCI) message that designates the PRBs, and the access node could accordingly transmit the transport block to the WCD in those designated PRBs. And when the WCD has data to transmit to the access node (e.g., for transmission on the transport network), the WCD could transmit to the access node a scheduling request that carries with it a buffer status report (BSR) indicating how much data the WCD has buffered for transmission. And in response, the access node could allocate one or more uplink PRBs in an upcoming subframe for carrying a transport block of that data from the WCD and could transmit to the WCD a DCI message that designates those upcoming PRBs, and the WCD could then accordingly transmit the transport block to the access node in the designated PRBs.

In line with the discussion above, the present disclosure provides for controlling (e.g., restricting) WCD connectivity with the access node in a scenario where the WCD does not support a particular service feature of the access node that is deemed to be critical to service. As noted above, this mechanism could be implemented with respect to various service features.

Without limitation, for instance, the mechanism could be applied in a scenario where the carrier at issue is configured with a subcarrier shift between its downlink and uplink but where the WCD is not programmed to understand that feature, perhaps because the WCD is a legacy WCD that includes no control logic related to the feature.

This example scenario could arise, for instance, if the carrier is a TDD carrier defined in a particular frequency band and if the carrier has the same subcarrier spacing on its downlink and its uplink but with the subcarriers on the uplink being shifted in frequency from the subcarriers on the downlink. For example, the TDD carrier might be configured with subcarriers spaced every 15 kHz on both the downlink and the uplink, but the frequency position of those subcarriers on the uplink might be offset from the frequency position of those subcarriers on the downlink by 7.5 kHz. Thus, if the TDD carrier bandwidth is divided into 7.5 kHz frequency points, the downlink might be configured with subcarriers on the odd numbered 7.5 kHz frequency points, but the uplink might be configured with subcarriers on the even numbered 7.5 kHz frequency points. This subcarrier shift between downlink and uplink might be technically beneficial for one or more reasons, the specifics of which are not pertinent.

With such a carrier configuration, the access node would provide its downlink transmissions on resource elements at the downlink subcarriers, in accordance with the subcarrier positioning on the downlink, and a WCD should be able to receive those transmissions accordingly. Further, the WCD would provide its uplink transmissions on resource elements at the uplink subcarriers, in accordance with the subcarrier positioning on the uplink, and the access node would be able to those transmissions accordingly.

The access node could be configured to treat the carrier in this manner, operating in accordance with the downlink-uplink subcarrier shift.

Further, the access node could include in one of its broadcast system messages on the carrier an information element that informs WCDs in coverage of the access node on the carrier that the carrier has that downlink-uplink subcarrier shift. For instance, the access node could include in a SIB message a binary codeword that represents a "frequencyShift7p5khz-TDD" operational parameter, setting that parameter to "true".

If a WCD that is in coverage of the access node on the carrier receives and reads this broadcast system message and the WCD is programmed to understand that binary codeword (set to true) as being an indication that the carrier is configured with the downlink-uplink subcarrier shift, then the WCD could responsively operate in accordance with the downlink-uplink subcarrier shift.

But WCD 16 may not have such control logic. For instance, WCD 16 may possess mapping data that maps each of various particular codewords to associated operational parameter constructs that the codeword represents so that the WCD could determine from the mapping data what a particular binary codeword means. However, that mapping data may not encompass the binary codeword in included in the broadcast system message that corresponds with configuration of the carrier with the downlink-uplink subcarrier shift. Alternatively, in some other manner, the WCD 16 may not possess mapping data or other such program logic that establishes that the binary codeword included in the broadcast system message corresponds with configuration of the carrier with the downlink-uplink subcarrier shift.

Therefore, when the WCD receives and reads the broadcast system message, the WCD would be unable to interpret that data and would not learn that the carrier is configured with the downlink-uplink subcarrier shift. As a result, the WCD's transmissions on the uplink may not have the 7.5 kHz shifting in relation to the subcarriers on the downlink. In some situations, this may create interference and other issues that are undesirable. Therefore, it may be better for the WCD to not even attempt connection with the access node on the carrier.

In line with the discussion above, the present disclosure provides for helping to prevent a the WCD from connecting with the access node on the carrier in this example scenario by (a) having the binary codeword representing the "frequencyShift7p5khz-TDD" feature be designated as critical to service on the carrier, and (a) having the WCD forgo connecting with the access node on the carrier in response to at least the combined factors of (i) the WCD being unable to interpret that binary codeword and (ii) the binary codeword being designated as critical to service on the carrier.

In an example implementation, the access node could designate the binary codeword as being critical to service on the carrier by setting forth the binary codeword within a section of the broadcast system message designated as containing information that is critical to service on the carrier. For instance, the access node could set forth in the message a section header that includes a "critical" extension structured in accordance with the ASN.1 standard in a manner interpretable by the WCD, and the access node could include the "frequencyShift7p5khz-TDD" binary codeword in that section of the message. Alternatively, the access node could indicate the critical (e.g., essential) nature of this operational parameter in another manner.

Further, the WCD could be programmed with control logic to detect that the broadcast system message contains data that seems to be an information element but that the WCD cannot interpret—as the WCD may not possess mapping data or other such logic to translate the binary codeword to the intended a manner that would be understandable and useable by the WCD. And the WCD could further be programmed with control logic to detect that the broadcast system message designates that uninterpretable data as being critical to service on the carrier, and therefore, because the WCD is unable to interpret the data, to forgo connecting with the access node on the carrier.

Accordingly, with this arrangement, even if the WCD is within threshold strong enough coverage of the access node on the carrier to justify connecting with the access node on the carrier, the WCD may determine that the WCD should forgo connecting with the access node on the carrier, at least because the WCD cannot interpret data in the access node's broadcast system message that the message designates as critical to service on the carrier. Whereas, if the data that was uninterpretable by the WCD was not designated as critical to service on the carrier, then the WCD could have proceeded to connect with the access node, and if data designated as critical to service on the carrier was interpretable by the WCD, then the WCD could have proceeded to connect with the access node.

Note also that the WCD could further condition its decision to forgo connecting with the access node on a determination that the carrier at issue is in a particular frequency band or that the carrier is of a particular configuration such as TDD or FDD. For instance, there may be technical justification to apply this process only if the carrier is in band 41 and/or if the carrier is TDD rather than FDD. To facilitate this, the WCD could determine from its own program logic or reference data that the carrier at issue is in band 41 and/or that the carrier at issue is TDD. And the WCD's decision to forgo connecting with the access node on the carrier could then be based on a combination of (i) the carrier being in that particular band rather than in another band and/or being TDD rather than FDD (ii) the WCD determining that the WCD is unable to interpret data in the system message that the access node broadcasts on the carrier, and (iii) the broadcast system message designating that data as critical to operation on the carrier.

Figure 2:
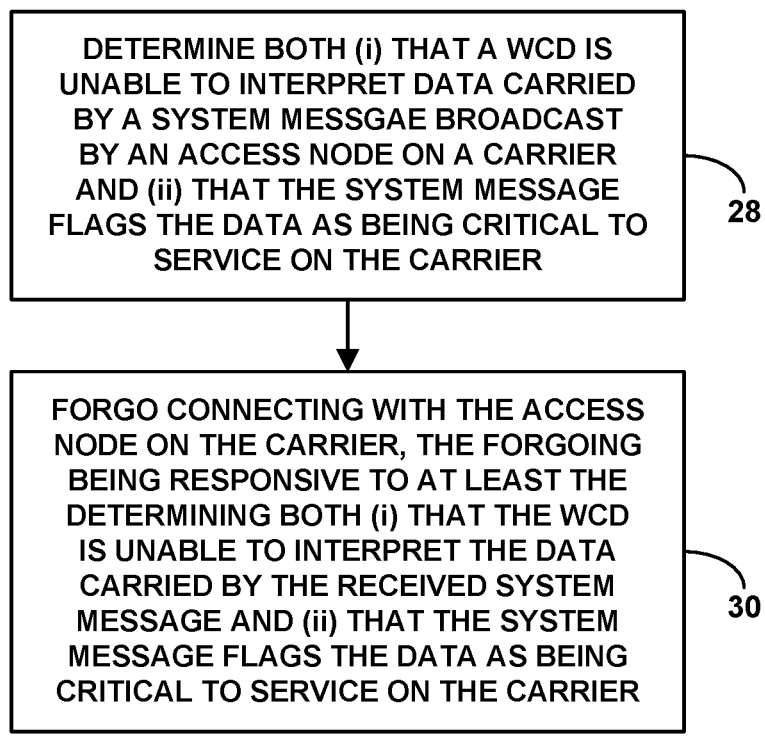
FIG. 2 is a flow chart depicting an example method in accordance with the present disclosure.

FIG. 2 is a flow chart depicting a method that could be carried out by a WCD in accordance with the present disclosure. In an example implementation, the WCD that carries out this method could have a wireless communication interface including an antenna structure through which the WCD engages in air-interface communication. Further, the WCD could include a controller that carries out or causes the WCD to carry out the method to control whether the WCD connects with an access node when the WCD is within coverage of the access node on a carrier AND the WCD receives a system message broadcast by the access node on the carrier, the system message carrying data that represents an operational parameter for service on the carrier.

As shown in FIG. 2, at block 28, the method includes determining both (i) that the WCD is unable to interpret the data carried by the received system message and (ii) that the system message flags the data as being critical to service on the carrier. And at block 30, the method includes the WCD forgoing connecting with the access node on the carrier, with the forgoing being responsive to at least the determining both (i) that the WCD is unable to interpret the data carried by the received system message and (ii) that the system message flags the data as being critical to service on the carrier.

In line with the discussion above, the system message in an example implementation could comprise a SIB, in which case the controller could be configured to read the SIB after discovering coverage of the access node on the carrier. Further, the system message could flag the data as being critical to service on the carrier by setting forth the data within a section of the system message that is designated as containing information critical to service on the carrier, and the act of determining that the system message flags the data as being critical to service on the carrier could involve determining that the data is enclosed in the section of the system message designated as containing information critical to service on the carrier.

As further discussed above, the operational parameter for service on the carrier could define a policy rule for service on the carrier. Further or alternatively, the operational parameter for service on the carrier could indicate a configuration of the carrier, such as that the carrier is configured with a subcarrier-offset between downlink and uplink communication, and perhaps specifically that the carrier a TDD carrier configured with a subcarrier-offset between downlink and uplink communication, among other possibilities.

Still further, as noted above, the carrier could be within a particular frequency band and/or could have a particular duplex configuration such as TDD or FDD for instance, and the method could additionally involve determining that the carrier is in that particular frequency band and/or has that particular duplex configuration. And in that case, the act of the WCD forgoing connecting with the access node on the carrier could be responsive to at least determining, in combination, (i) that the WCD is unable to interpret the data that is carried by the received system message, (ii) that the system message flags the data as being critical to service on the carrier, and (iii) that the carrier is in the particular frequency band and/or has the particular duplex configuration.

In addition, as discussed above, the data in the broadcast system message could be a binary codeword (e.g., any bit sequence or sequences) that represents the operational parameter for service on the carrier. And in that case, the act of determining that the WCD is unable to interpret the data could involve determining that the WCD does not possess a definition of the binary codeword—such as that the UE does not possess mapping data that maps the binary codeword to a definition of the binary codeword for instance.

Yet further, in an example implementation, the act of the WCD forgoing connecting with the access node on the carrier could involve the WCD forgoing from determining whether coverage of the access node received by the WCD is threshold strong. For instance, if the WCD has not yet evaluated reference signal strength on the carrier, the WCD could forgo doing so. Alternatively, the act of the WCD forgoing connecting with the access node on the carrier could involve, after the WCD determines (e.g., has determined) that coverage of the access node received by the WCD on the carrier is threshold strong, the WCD then not engage in signaling with the access node for connecting with the access node on the carrier.

Figure 3:
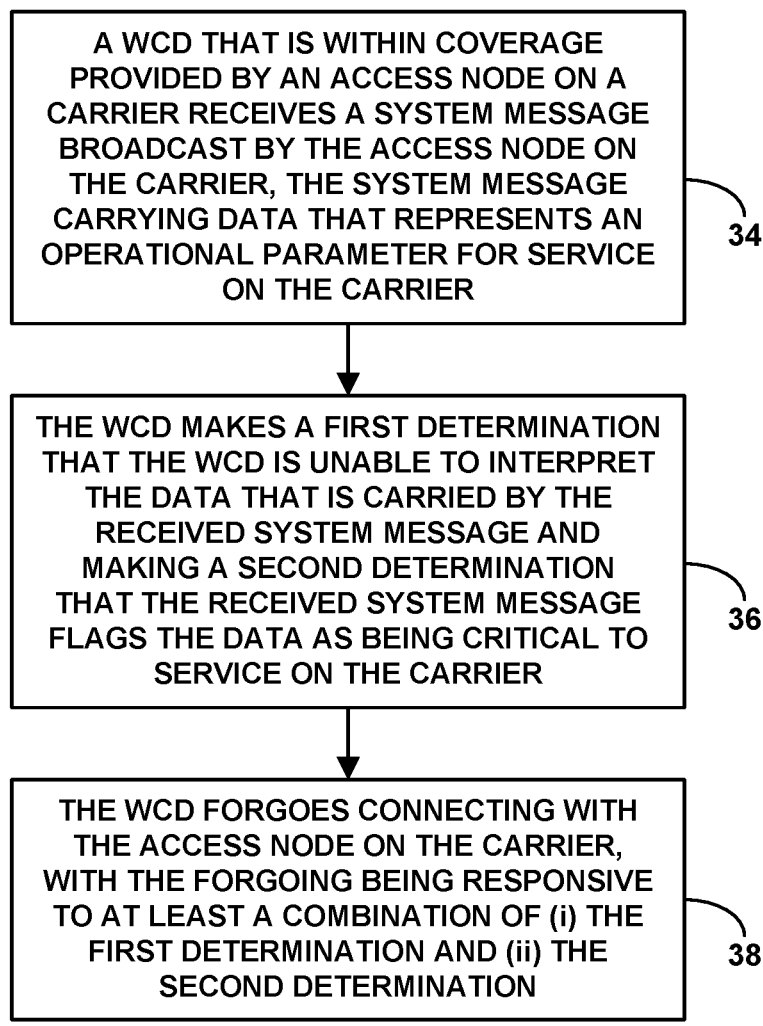
FIG. 3 is another flow chart depicting an example method in accordance with the present disclosure.

FIG. 3 is next another flow chart depicting a method that could be carried out in accordance with the present disclosure to control wireless connectivity. Here too, this method could be carried out by a WCD as described herein.

As shown in FIG. 3, at block 34, the method includes a WCD that is within coverage provided by an access node on a carrier receiving a system message broadcast by the access node on the carrier, the system message carrying data that represents an operational parameter for service on the carrier. Further, at block 36, the method includes the WCD making a first determination that the WCD is unable to interpret the data that is carried by the received system message and making a second determination that the received system message flags the data as being critical to service on the carrier. And at block 38, the method includes the WCD forgoing from connecting with the access node on the carrier, with the forgoing being responsive to at least a combination of (i) the first determination and (ii) the second determination.

Various features described above can be implemented in this context as well, and vice versa. For instance, the operational parameter could be a policy rule and/or could indicate a configuration of the carrier, such as a downlink-uplink subcarrier shift. Further, the data could include a binary codeword that represents the operational parameter for service on the carrier, in which case the act of determining that the WCD is unable to interpret the data could involve determining that the WCD does not possess a definition of the binary codeword. And still further, this functionality could be further limited to a scenario where the carrier is in a particular frequency band.

As discussed above, the present disclosure also contemplates having an access node carry out operations to control wireless connectivity. For instance, the access node could wirelessly broadcast on carrier on which the access node provides service a system message for receipt by WCDs within coverage of the access node on the carrier, the system message containing data that represents an operational parameter for service on the carrier. Further, the access node could control WCD connectivity with the access node, by configuring the broadcast system message to flag the data as being critical to operation on the carrier, so as to cause each of one or more WCD that receives the broadcast system message to forgo connecting with the access node on the carrier in response to the WCD determining in combination (i) that the WCD is unable to interpret the data carried by the broadcast system message and (ii) that the broadcast system message flags the data as being critical to operation in the cell.

Figure 4:
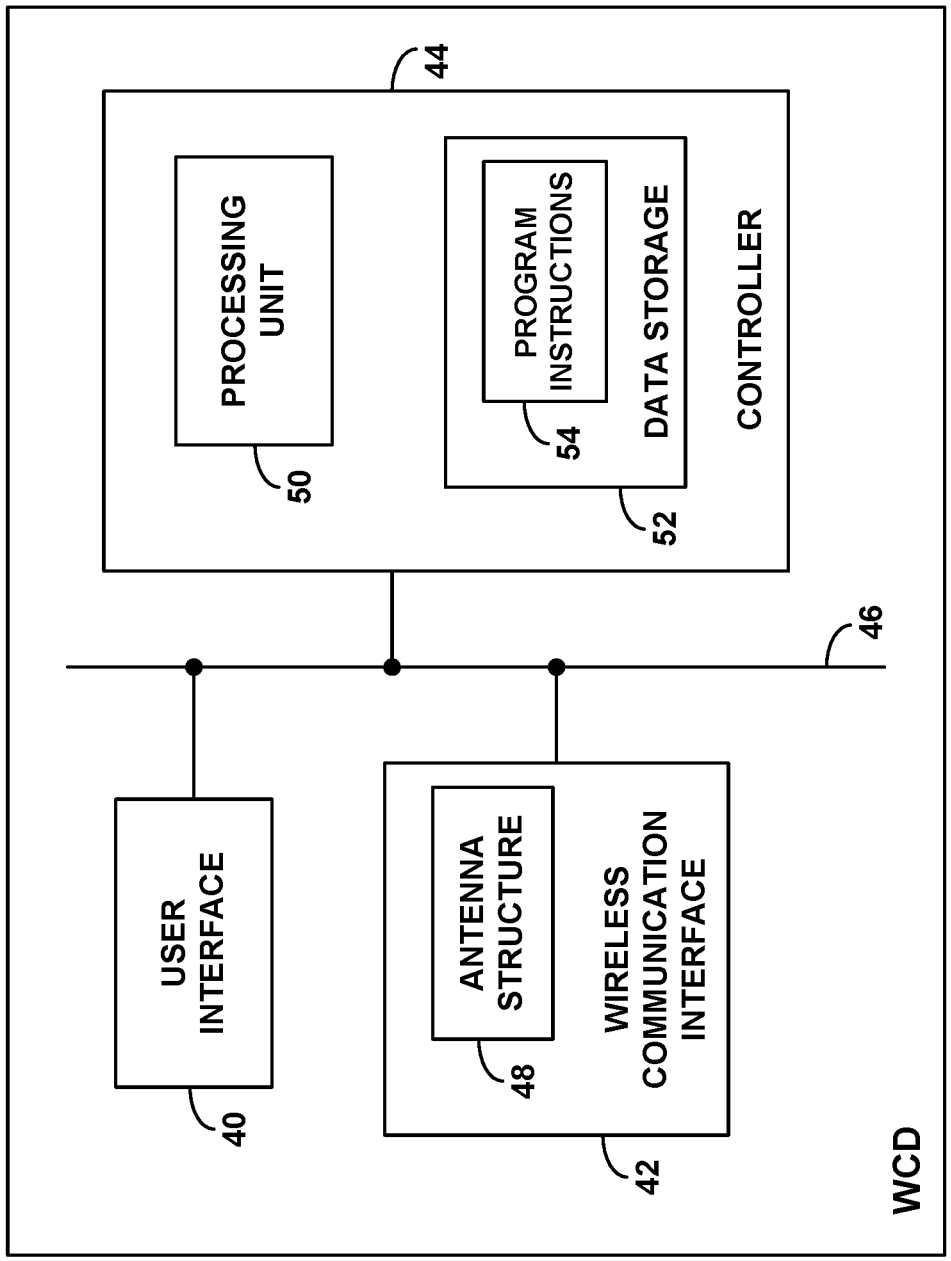
FIG. 4 is a simplified block diagram of an example WCD operable in accordance with the present disclosure.

Finally, FIG. 4 is a simplified block diagram of a WCD that could be configured to carry out various WCD operations described herein. A shown, the example WCD includes a user interface 40, a wireless communication interface 42, and a controller 44, all of which could be communicatively linked together by a system bus, network, or other connection mechanism 46 and/or could be integrated together or distributed in various ways.

In this example arrangement, the user interface 40 (which might be omitted if the WCD is not user operated) could include input and output components that facilitate user interaction with the WCD. And the wireless communication interface 42 could include one or more RF chains and associated logic to support communication according to one or more RATs, including an antenna structure 48 through which to engage in air-interface communication.

Further, controller 44 could comprise control logic to cause the WCD to carry out particular WCD operations described herein. For instance, the controller 44 could include a processing unit 50 including one or more processors (e.g., general purpose microprocessors and/or dedicated processing units), non-transitory data storage 52 (e.g., one or more volatile and/or non-volatile storage components, such as magnetic, optical, or flash storage), and program instructions 54 stored in the non-transitory data storage and executable by the processing unit 50 to cause the WCD to carry out the operations.

Various features described above can be implemented in this context as well, and vice versa.

Exemplary embodiments have been described above. Those skilled in the art will understand, however, that changes and modifications may be made to these embodiments without departing from the true scope and spirit of the invention.

What is claimed is:

1. A wireless communication device (WCD) comprising:
    a wireless communication interface including an antenna structure through which to engage in air-interface communication; and
    a controller configured to control whether the WCD connects with an access node when the WCD is within coverage of the access node on a carrier and the WCD receives a system message broadcast by the access node on the carrier, the system message carrying data that represents an operational parameter for service on the carrier, and wherein controlling whether the WCD connects with the access node on the carrier comprises carrying out operations including:

determining both (i) that the WCD is unable to interpret the data carried by the received system message and (ii) that the system message flags the data as being critical to service on the carrier, and causing the WCD to forgo connecting with the access node on the carrier, wherein causing the WCD to forgo connecting with the access node on the carrier is responsive to at least the determining both (i) that the WCD is unable to interpret the data carried by the received system message and (ii) that the system message flags the data as being critical to service on the carrier.

2. The WCD of claim 1, wherein the controller comprises a processing unit, non-transitory data storage, and program instructions stored in the non-transitory data storage and executable by the processing unit to carry out the operations.

3. The WCD of claim 1, wherein the system message comprises a system information block (SIB), wherein the controller is configured to read the SIB after discovering coverage of the access node on the carrier.

4. The WCD of claim 1, wherein the system message flags the data as being critical to service on the carrier by setting forth the data within a section of the system message that is designated as containing information critical to service on the carrier, and wherein determining that the system message flags the data as being critical to service on the carrier comprises determining that the data is enclosed in the section of the system message designated as containing information critical to service on the carrier.

5. The WCD of claim 1, wherein the operational parameter for service on the carrier defines a policy rule for service on the carrier.

6. The WCD of claim 1, wherein the operational parameter for service on the carrier indicates a configuration of the carrier.

7. The WCD of claim 6, wherein the operational parameter for service on the carrier comprises an indication that the carrier is configured with a subcarrier-offset between downlink and uplink communication.

8. The WCD of claim 6, wherein the operational parameter for service on the carrier comprises an indication that the carrier is a TDD carrier configured with a subcarrier-offset between downlink and uplink communication.

9. The WCD of claim 1, wherein the carrier has an attribute selected from the group consisting of being in a particular frequency band and having a particular duplex configuration, wherein the operations further comprise:

determining that the carrier has the attribute, wherein causing the WCD to forgo connecting with the access node on the carrier is responsive to at least determining, in combination, (i) that the WCD is unable to interpret the data that is carried by the received system message, (ii) that the system message flags the data as being critical to service on the carrier, and (iii) that the carrier having the attribute.

10. The WCD of claim 1, wherein the data comprises a binary codeword representing the operational parameter for service on the carrier, and wherein determining that the WCD is unable to interpret the data comprises determining that the WCD does not possess a definition of the binary codeword.

11. The WCD of claim 10, wherein determining that the WCD does not possess a definition of the binary codeword comprises determining that the UE does not possess mapping data that maps the binary codeword to a definition of the binary codeword.

12. The WCD of claim 1, wherein causing the WCD to forgo connecting with the access node on the carrier comprises causing the WCD to forgo determining whether coverage of the access node received by the WCD is threshold strong.

13. The WCD of claim 1, wherein causing the WCD to forgo connecting with the access node on the carrier comprises, after the WCD determines that coverage of the access node received by the WCD on the carrier is threshold strong, causing the WCD to not engage in signaling with the access node for connecting with the access node on the carrier.

14. A method for controlling wireless connectivity, the method comprising:

receiving by a WCD that is within coverage provided by an access node on a carrier, a system message broadcast by the access node on the carrier, the system message carrying data that represents an operational parameter for service on the carrier;

making a first determination, by the WCD, that the WCD is unable to interpret the data that is carried by the received system message;

making a second determination, by the WCD, that the received system message flags the data as being critical to service on the carrier; and forgoing by the WCD from connecting with the access node on the carrier, wherein the forgoing is responsive to at least a combination of (i) the first determination and (ii) the second determination.

15. The method of claim 14, wherein the operational parameter for service on the carrier defines a policy rule for operation on the carrier.

16. The method of claim 14, wherein the operational parameter for service on the carrier indicates a configuration of the carrier.

17. The method of claim 16, wherein the operational parameter for service on the carrier indicates that the carrier is configured with a subcarrier shift between uplink and downlink.

18. The method of claim 14, wherein the data comprises a binary codeword representing the operational parameter for service on the carrier, and wherein determining that the WCD is unable to interpret the data comprises determining that the WCD does not possess a definition of the binary codeword.

19. The method of claim 14, further comprising making a third determination that the carrier has a particular attribute selected from the group consisting of being in a particular frequency band and having a particular duplex configuration, wherein the forgoing by the WCD from connecting with the access node is responsive to at least a combination of (i) the first determination, (ii) the second determination, and (iii) the third determination.

20. A method for controlling wireless connectivity, the method comprising:

wirelessly broadcasting by an access node on carrier on which the access node provides service, a system message for receipt by wireless communication devices (WCDs) within coverage of the access node on the carrier, wherein the system message contains data that represents an operational parameter for service on the carrier; and controlling, by the access node, WCD connectivity with the access node, wherein the controlling involves configuring the broadcast system message to flag the data as being critical to operation on the carrier, wherein the broadcast system message flagging the data as critical to operation on the carrier causes each of one or more WCDs that receives the broadcast system message to forgo connecting with the access node on the carrier, wherein the forgoing is in response to the WCD determining in combination (i) that the WCD is unable to interpret the data carried by the broadcast system message and (ii) that the broadcast system message flags the data as being critical to operation in the cell.

* * * * *